United States Patent [19]
Strolo

[11] Patent Number: 5,870,033
[45] Date of Patent: Feb. 9, 1999

[54] KEYBOARD, IN PARTICULAR A MEMBRANE KEYBOARD

[76] Inventor: Lothar Strolo, Sofienstrasse 35, Detmold, Germany, 32756

[21] Appl. No.: 619,585

[22] PCT Filed: Nov. 10, 1994

[86] PCT No.: PCT/DE94/01330

§ 371 Date: Mar. 26, 1996

§ 102(e) Date: Mar. 26, 1996

[87] PCT Pub. No.: WO95/14967

PCT Pub. Date: Jun. 1, 1995

[30]     Foreign Application Priority Data

Nov. 23, 1993  [DE]   Germany ......................... 93 17 905 U

[51] Int. Cl.⁶ .................................................. H03M 11/00
[52] U.S. Cl. ...................... 341/22; 341/176; 364/709.12
[58] Field of Search ................ 341/22, 176; 364/709.12; 359/142, 154; 345/173

[56]          References Cited

U.S. PATENT DOCUMENTS

| 5,189,543 | 2/1993  | Lin ........................................... 359/142 |
| 5,534,865 | 7/1996  | Kriegsman ............................... 341/176 |
| 5,561,446 | 10/1996 | Montlick ................................... 345/173 |

*Primary Examiner*—Michael Horabik
*Assistant Examiner*—Albert K. Wong
*Attorney, Agent, or Firm*—Cohen, Pontani, Lieberman & Pavane

[57]         ABSTRACT

A keyboard system for activating equipment to be operated, including: a keyboard for generating activation signals, a wireless transmitter for wirelessly transmitting the activation signals; and a receiver connectable to the equipment to be operated for receiving the activation signals from the transmitter.

26 Claims, 9 Drawing Sheets

KEYBOARD, IN PARTICULAR A MEMBRANE KEYBOARD

BACKGROUND OF THE INVENTION

1. Field of the Invention

The invention relates to a keyboard, in particular a membrane keyboard, for the activation of equipment to be operated, in particular for the activation of a PC (personal computer).

2. Description of the Prior Art

Stationary operator control panels are used in all areas of technology. Operator control panels with membrane keyboards have been increasingly used for years. In the last twenty years, constant innovative development of these membrane keyboards has made this reliable electronic component become an important interface for data input and for man-machine dialog. The connection of the keys takes place by means of the membrane cable and can be made to be any length. Up to now, the end of the membrane cable has been designed either for direct or indirect plug connections. Consequently, its use is restricted to stationary applications and is preferably in the areas of automation, mechanical engineering, control technology, measuring technology, medical technology, communication technology and office automation.

SUMMARY OF THE INVENTION

The invention is based on the object of providing a keyboard whose use is not restricted to stationary applications, that is to say without stationary restriction, and thus can be used in the areas of automation, mechanical engineering, control technology, measuring technology, medical technology, communication technology and office automation to a greater and more varied extent than was possible with control panels of the past.

This object is achieved in the case of a membrane keyboard of the generic type mentioned at the beginning having the features of the defining part of patent claim 1, to be specific by the fact that activation signals required for operator control can be transmitted wirelessly from a transmitter assigned to the keyboard and a receiver assigned to the item of equipment to be operated.

According to the invention, membrane-key operator control panels suitable for the object to be respectively operated are provided with a remote control unit, for example an infrared transmitter, and are mounted, for example, on the outside of a window pane, for example a display window pane of a store. This mounting may be carried out, for example, by means of an adhesive film. Such membrane-key control panels may be, for example, keyboards comprising membrane control panels or else membrane mice.

The normal keyboard of the computer inside the store has an interface for, on the one hand, connecting this normal keyboard to the computer and, on the other hand, connecting a receiver part, for example an infrared receiver.

After the store has closed, or if need be during the day, the computer can then be switched over by the trained personnel from inside to the membrane-key remote control unit attached to the display window. The switchover device is located at the interface of the normal keyboard inside the display window, so that this switchover does not have to take place at the membrane-key remote control unit attached to the outside of the display window.

This at the same time achieves the effect that the system cannot be manipulated from outside by unauthorized persons. Only the functions intended for the outside operator, such as for example the keyboard functions, can be performed.

This makes it possible for interested persons to be able to operate the computer directly at the display window. In the same way, of course, a membrane mouse or other devices can be remotely controlled from outside.

The membrane-key remote control unit may, of course, also be used in quarantine wards of hospitals or other sensitive areas in industry or in research areas, in order to avoid contamination of the computer or other activated equipment, apparatus and machinery.

The transmitting part is either fastened as a board on the membrane-key unit or is expediently integrated into the membrane-key unit. The power supply to the membrane-key control unit is expediently provided by means of a battery, for example an R6 cell, which is likewise located in the membrane-key control unit.

Once the battery has run down, it is either exchanged or the entire system is removed and disposed of. Solar cells in combination with batteries can also be used as power sources, the batteries only coming into operation when the solar cells, which are located on the upper side of the membrane-key remote control unit, no longer supply sufficient power.

Applications for the membrane-key remote control unit are not restricted to keyboards or membrane mice.

For instance, on and off switching functions may be performed for rotating object carriers on which, for example, display dummies are located. In the same way, lighting systems may be operated from outside.

A further important field of application is the use of the membrane-key remote control units for remotely controllable locking systems. These have the advantage that they can be used variably. Depending on the place they are to be used, they can be attached without any problems to certain doors and/or windows or facades and be removed or exchanged after use or when there is a change of those with authorized access.

BRIEF DESCRIPTION OF THE DRAWINGS

The invention is to be explained in more detail below with reference to three exemplary embodiments represented in the attached drawing, in which.

DETAILED DESCRIPTION OF THE PREFERRED EMBODIMENTS

1. Membrane Mouse With Infrared Control

Figure 1:
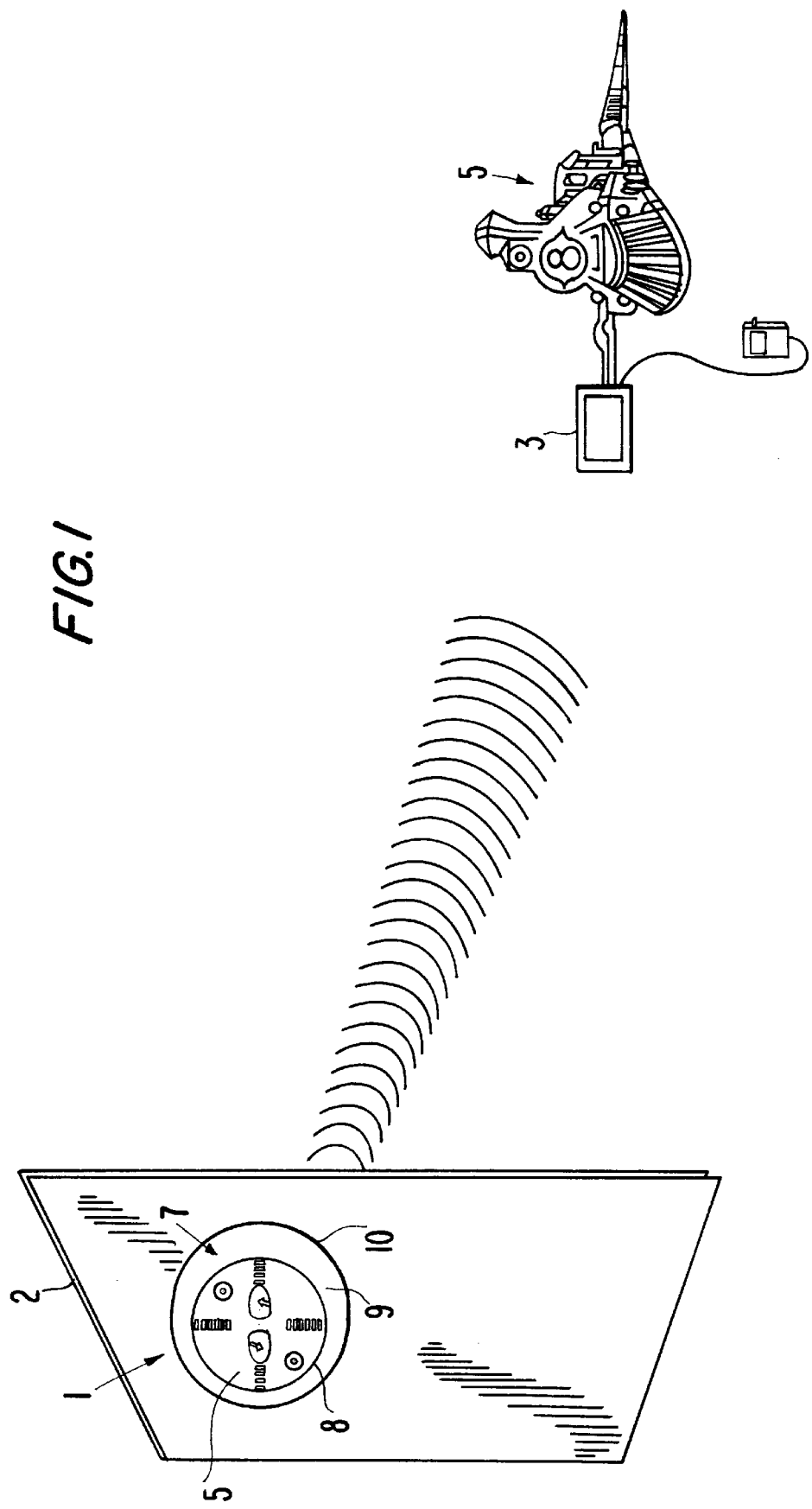
FIG. 1 is a diagrammatic representation of a membrane mouse for controlling a model railroad pursuant to the present invention.
Figure 2:
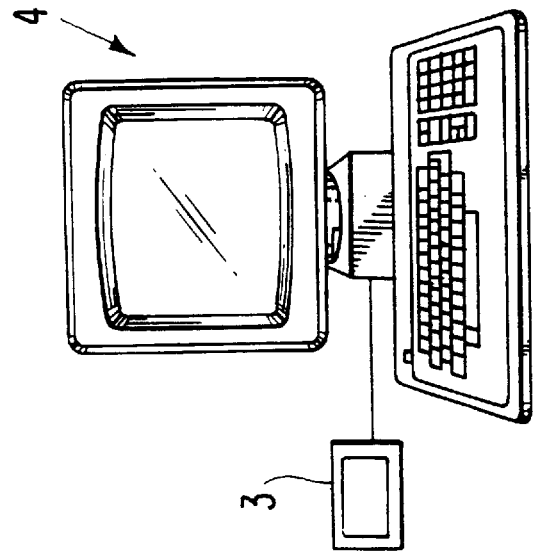
FIG. 2 is a diagrammatic representation of a membrane mouse for controlling a PC pursuant to the present invention.
Figure 2:
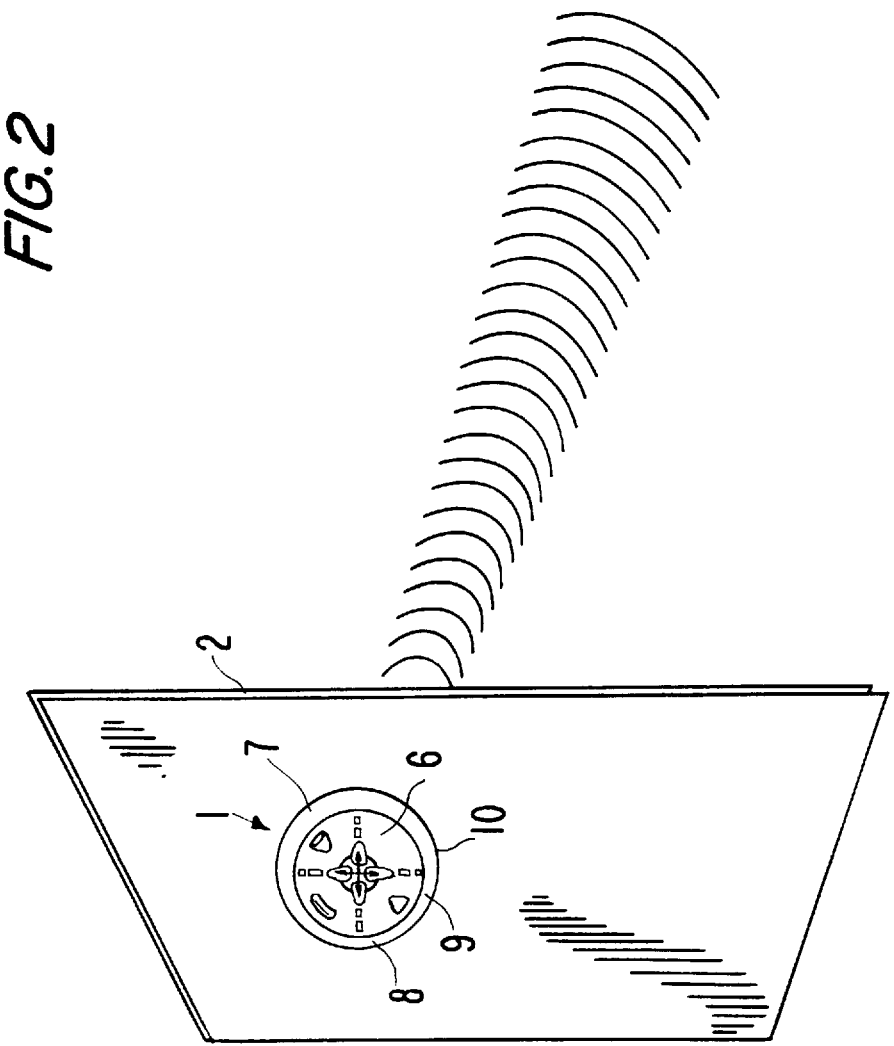

As can be seen in FIG. 1, a membrane mouse 1 is fitted with an infrared transmitter and is fastened on the outer surface of a pane 2, for example a display window. This is expediently carried out by means of an adhesive film. In this way, the membrane mouse 1 simulates a computer mouse. The energy supply is provided either just by a button cell or by a combination of a button cell with a solar cell, the button cell supplying power whenever insufficient power is generated by the solar cell. A receiving part 3 is connected by means of a standard plug (for example T-plug) to the keyboard connection of a keyboard 4, which can be operated from inside and outside, as in FIG. 2. Thus, for example, the display window 2 becomes a "show window", since the customer "presents" the demonstration programs or games from outside. This enhances the advertising effect of a display 5 since the onlookers attracted see all the articles of the display. Consequently, the customers can obtain detailed information even when the store is closed.

In the case of a membrane mouse 1 attached to the outside surface of the display window 2, the self-adhesive membrane 6, incorporating the contacts (pressure contacts) is adhesively attached on a circular plastic housing 7, which has the shape and size of a soup dish or bowl. The plastic housing 7 bears the membrane keyboard 6 on its outer side in a depression, so that the membrane keyboard is flush with a border 8 surrounding the depression. Outwardly, the border 8 merges into a relatively flat slope 9, so that the housing diameter increases toward the display window 2. The outer edge 10 of the slope 9 of the plastic housing 7 on the display window side encloses a circular fastening plate that is fastened on the housing side by domed fixing and screwing studs.

The dish-shaped plastic housing 7 encloses an electronics or circuit board for signal conditioning for the IR transmitting diode, likewise accommodated there, and a battery block for supplying power to the membrane mouse 1. The fastening plate is light-transmissive in the region of the IR transmitting diode through a hole on the transmitting path through the display window 2.

The fastening plate is provided on the display window side with a double-sided adhesive film, which can be adhesively attached to the display window 2 after peeling off a protective layer.

2. Infrared Locking System

A membrane-key remote control unit is designed in the form of a membrane numerical block and is fastened externally on the property to be secured. The receiving part is located inside the property. Consequently, readily flexible safety areas can be created, to be precise preferably wherever embedded installation or other fastening is not possible or desired. This may be, for example, exterior facades of great value, properties which are just rented or properties in which individual areas are being used only temporarily due to conversion or renovation work. Such flexible safe areas may be created in hotels (VIP area, conference centers), in company premises and work areas or on trade-fair stands. Possible areas of use include residential and commercial buildings, retail stores, department store chains, administrative departments, research, technology and development.

3. Membrane Keyboard With Infrared Control and Receiving Part With 102 Keys

Figure 3:
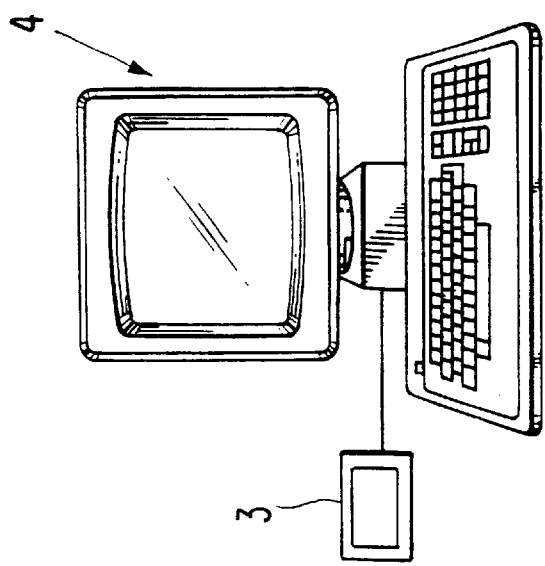
FIG. 3 is a diagrammatic representation of a membrane keyboard for controlling a PC pursuant to the present invention.
Figure 3:
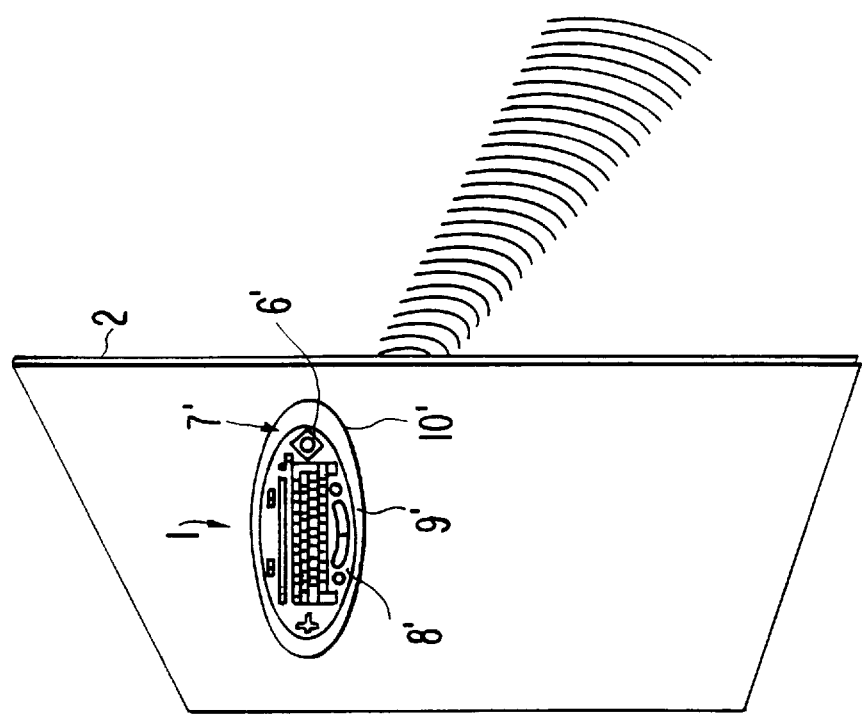
Figure 4:
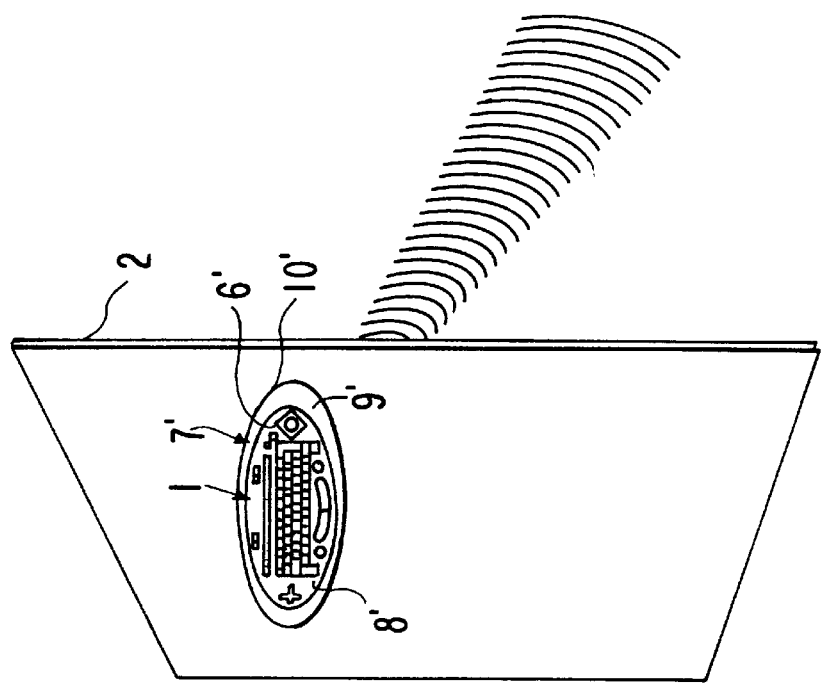
FIG. 4 is a diagrammatic representation of a membrane keyboard for controlling a PC and an exhibit pursuant to the present invention.
Figure 4:
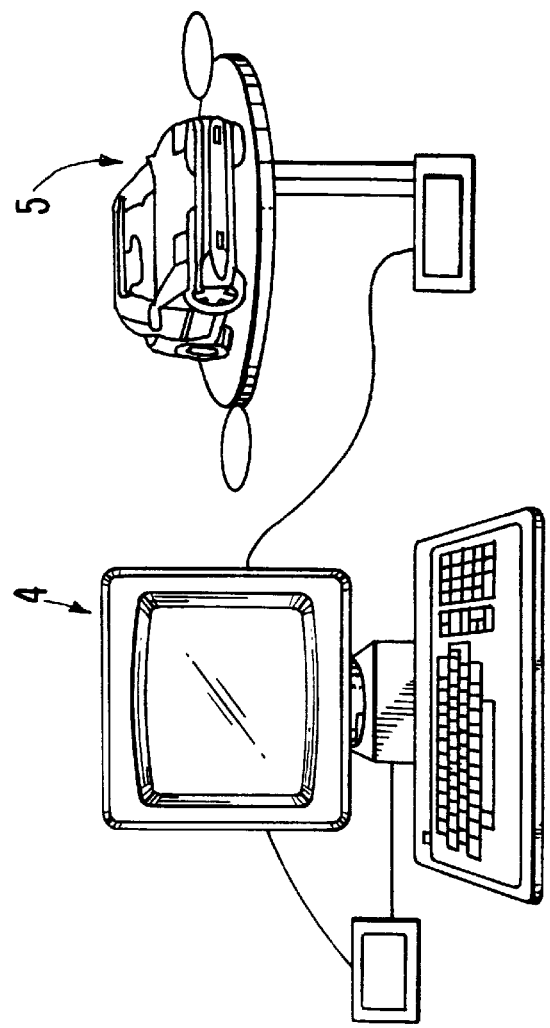

In this example as shown in FIGS. 3 and 4, the membrane-key remote control unit to be fastened from outside simulates the keyboard 6' of a PC with 102 keys. The connection of the receiving part 3 and the power supply are as described in Example 1. Preferred areas of use are computer retail stores, which have sophisticated demonstration programs set up for operation from the outside part of their display windows 2 and consequently can conduct 3-D marketing of an item, such as an automobile 5.

The membrane keyboard 6' attached to the outside surface of the display window 2 is adhesively attached on an oval, bowl shaped plastic housing 7'. The plastic housing 7' bears the membrane keyboard 6' on its outer side in a depression, so that the membrane keyboard finishes flush with a border 8' surrounding the depression. outwardly the border 8' merges into a relatively flat slope 9', so that the diameter increases toward the display window 2. The edge 10' of the slope 9' of the plastic housing 7' on the display window side encloses a fastening plate which is fastened on the housing side by domed fixing and screwing studs. The fastening plate is light-transmissive in the region of the IR transmitting diode through a hole on the transmitting path through the display window pane 2.

The plastic housing 7' encloses a circuit board for signal conditioning for the IR transmitting diode, likewise accommodated there, and a battery block for supplying power to the keyboard 6'.

As also in the case of the first embodiment, the fastening plate is provided on the display window side with a double-sided adhesive film, which is to be adhesively attached to the display window 2 after peeling off a protective layer.

Figure 7:
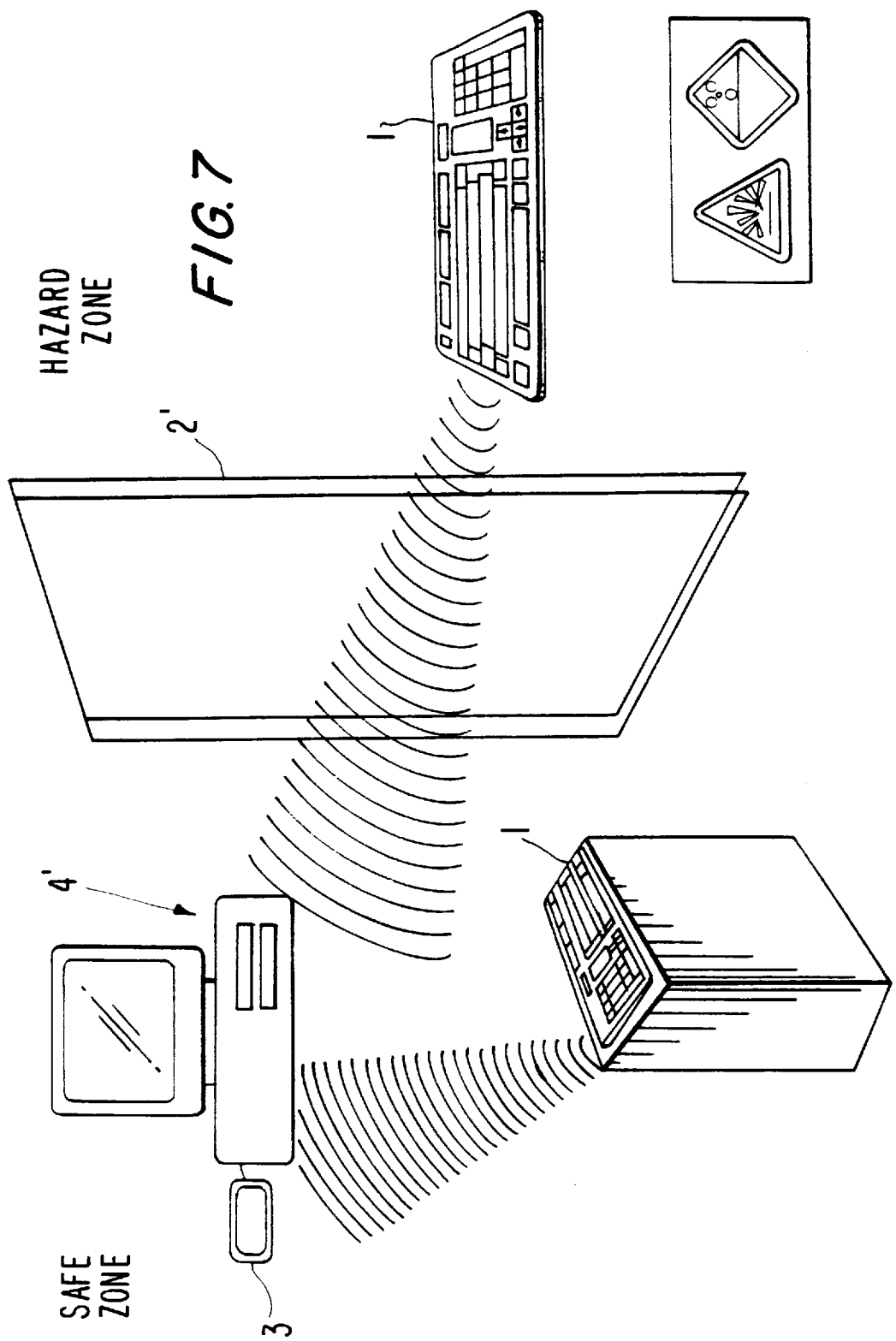
FIG. 7 is a diagrammatic representation of two membrane keyboards for controlling one and the same PC, one keyboard being located in a safe zone and the other in a hazard zone, pursuant to the present invention.
Figure 8:
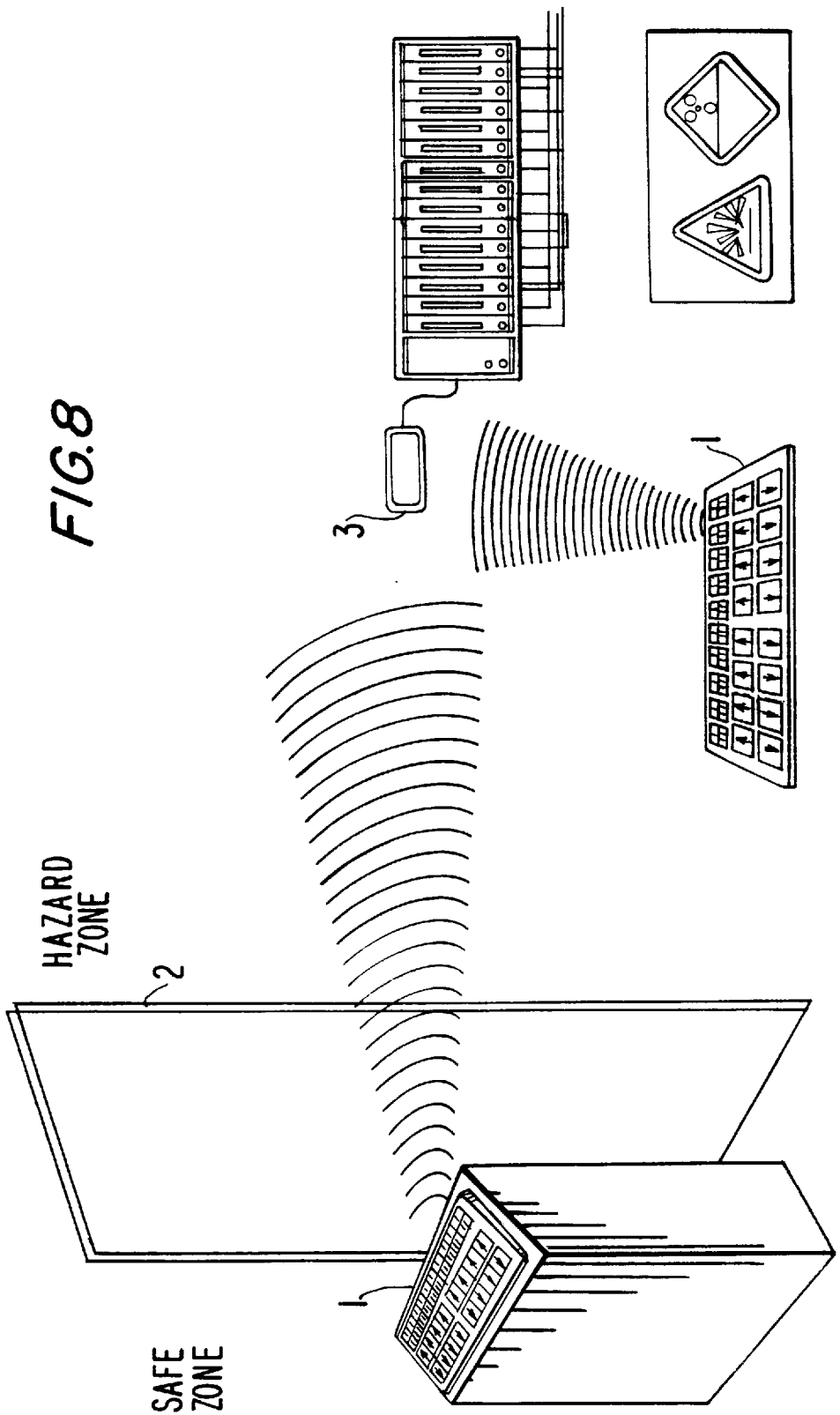
FIG. 8 is a diagrammatic representation of two membrane keyboards for controlling one and the same device in a hazard zone, pursuant to the present invention.
Figure 9:
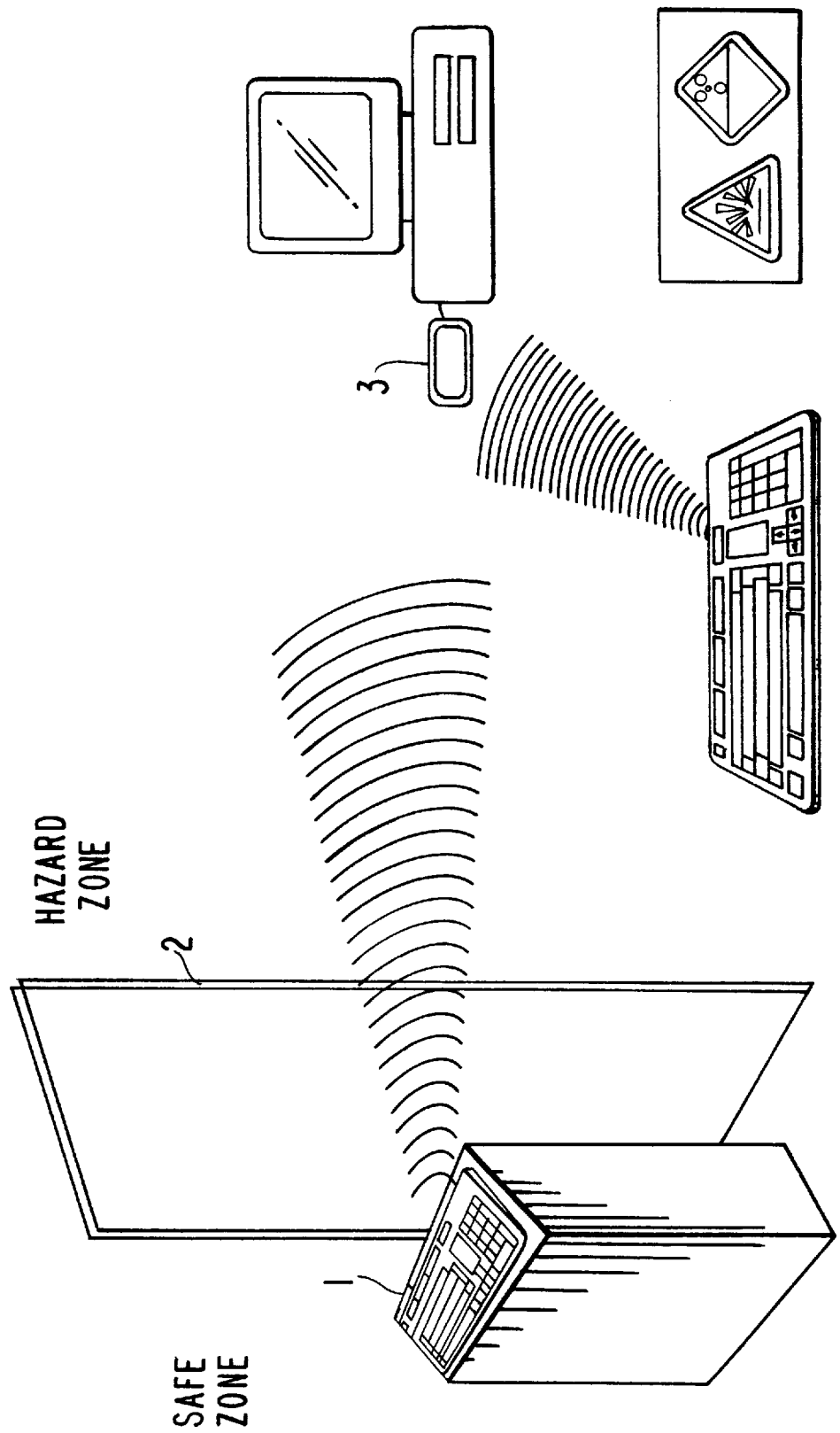
FIG. 9 is a diagrammatic representation of two membrane keyboards for controlling a common computer in a hazard zone, similarly to the embodiment of FIG. 8.

The above-mentioned membrane-key remote-controlled keyboards can, however, also be used in exhibited objects of science and research, in which high-cost computers and devices of complex equipment control have to be operated with protection against dust, water and radiation, as represented in FIGS. 8 and 9. Equally, computers 4' located behind a transparent screen 2' can be operated in quarantine wards by patients who have to stay in specially protected rooms where there is a contamination risk, as seen in FIG. 7.

Figure 6:
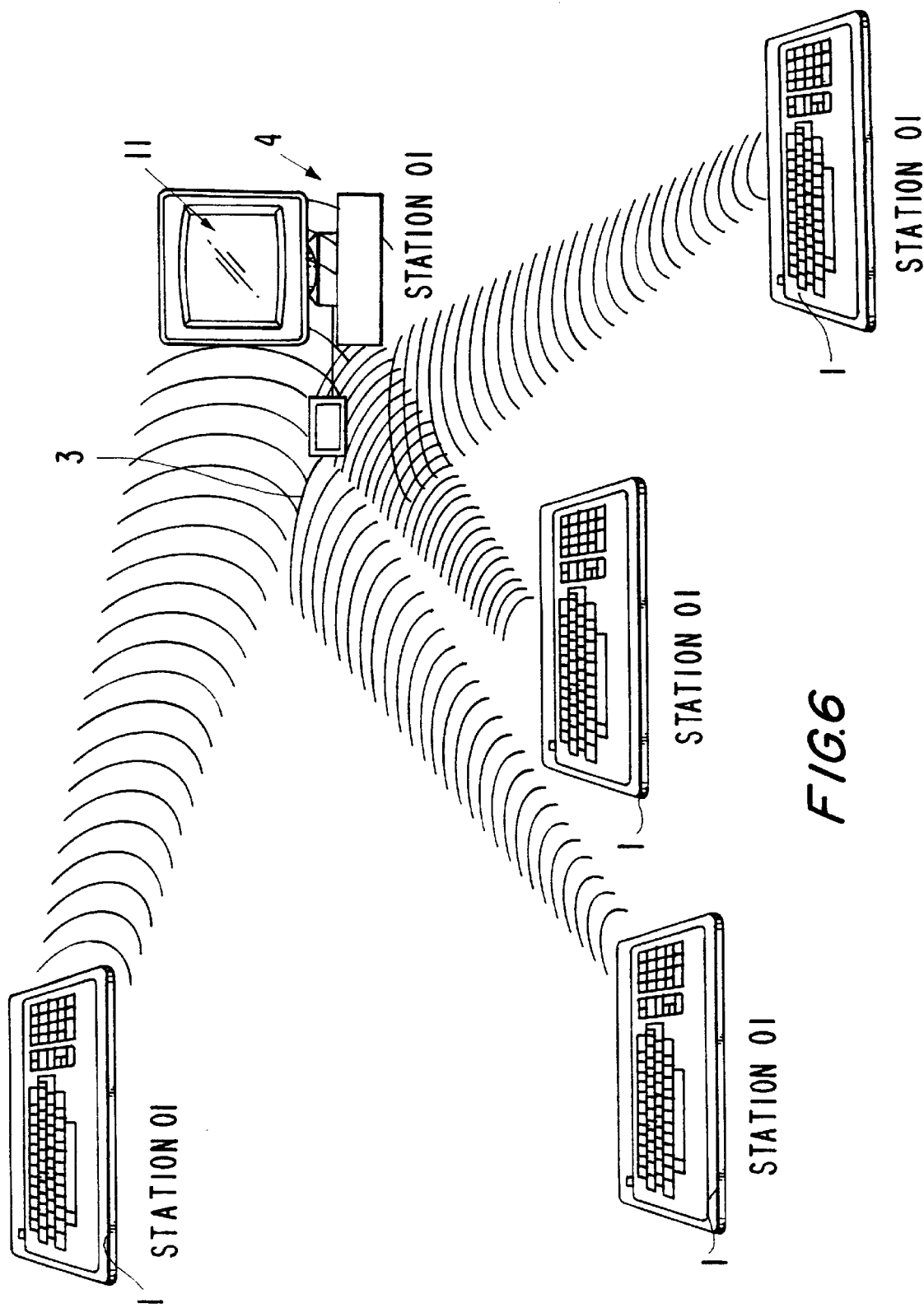
FIG. 6 is a diagrammatic representation of four membrane keyboards for controlling one and the same PC pursuant to the present invention.

In addition, the keyboard 6' with 102 keys can also be used for PC training purposes, one single PC 4' being provided with a, preferably large, screen 11 and each participant using an individual keyboard 6', as represented in FIG. 6. The PC 4' is network-compatible and has the same number of interface cards as the number of keyboards 6' being used. Built into each keyboard 6' is a transmitter, that has an omnidirectional infrared transmitting diode that protrudes out of the keyboard housing.

The transmitter transmits data packets in which a keyboard address is in each case contained. Address decoders are provided in the receiver 3 for directing the data received in accordance with the decoded address in each case to an interface card which is assigned to this address. The data messages are transmitted in pulse form, the pulses being emitted from the transmitter in the form of high-frequency oscillations of a specific frequency. In the receiver 3 there is provided a filter which is tuned to this specific frequency and prevents the inadvertent evaluation of different, unwanted infrared light pulses.

The receiver 3 contains an automatically operating setting element for sensitivity (AGC), and the transmitter transmits at the beginning of its pulse message a 2-bit carrier, with which the AGC setting is performed in the receiver. If there is inadequate light intensity at the receiver input, the pulse duty factor of the pulses can be set at the transmitter end in stages between 6% through 12% to 25%.

The keys of the keyboard 6' are arranged in rows and columns to form a matrix, which is scanned by an oscillator of the keyboard at a 2-kHz clock rate. A dedicated channel is provided for each key, and an 8-bit key code is used.

Also transmitted with the pulse message is a parity bit, which serves at the receiver end for parity checking, i.e. checking for an even number of one-bits.

In the transmission of the pulse messages, biphase amplitude modulation is used.

The keyboard 6' also contains a time counting circuit, which is retriggered with each key actuation, in order to recommence counting. The time counting circuit controls the power supply for the transmitting mode of the keyboard 6', in which currents of the order of 1A occur. After expiration of a characteristic time of the time counting circuit during which no key actuation has taken place, a signal for power supply for the transmitting mode drops, thereby setting a "sleep mode", i.e. a standby mode, in which the keyboard continues to be scanned at the 2-kHz clock rate, the power consumption decreasing into the $\mu A$ range.

In an alternative refinement of the receiver 3, a single address decoder, is provided which passes on the data from the received data message to the PC 4 only if the decoded address corresponds to its own address, to which it has been set by a switch accessible from the underside of the receiver 3.

The device described above can also be used for demonstrating the operating principle of a network, in that for example a letter running over two PCs 4 is presented.

Of the 102 channels available via the keyboard 6', the 16 keys arranged in the upper row can be used for hardware control, for example in order to actuate lamps or display motors in a controlling manner, as represented in FIGS. 1, 4 and 8.

Figure 5:
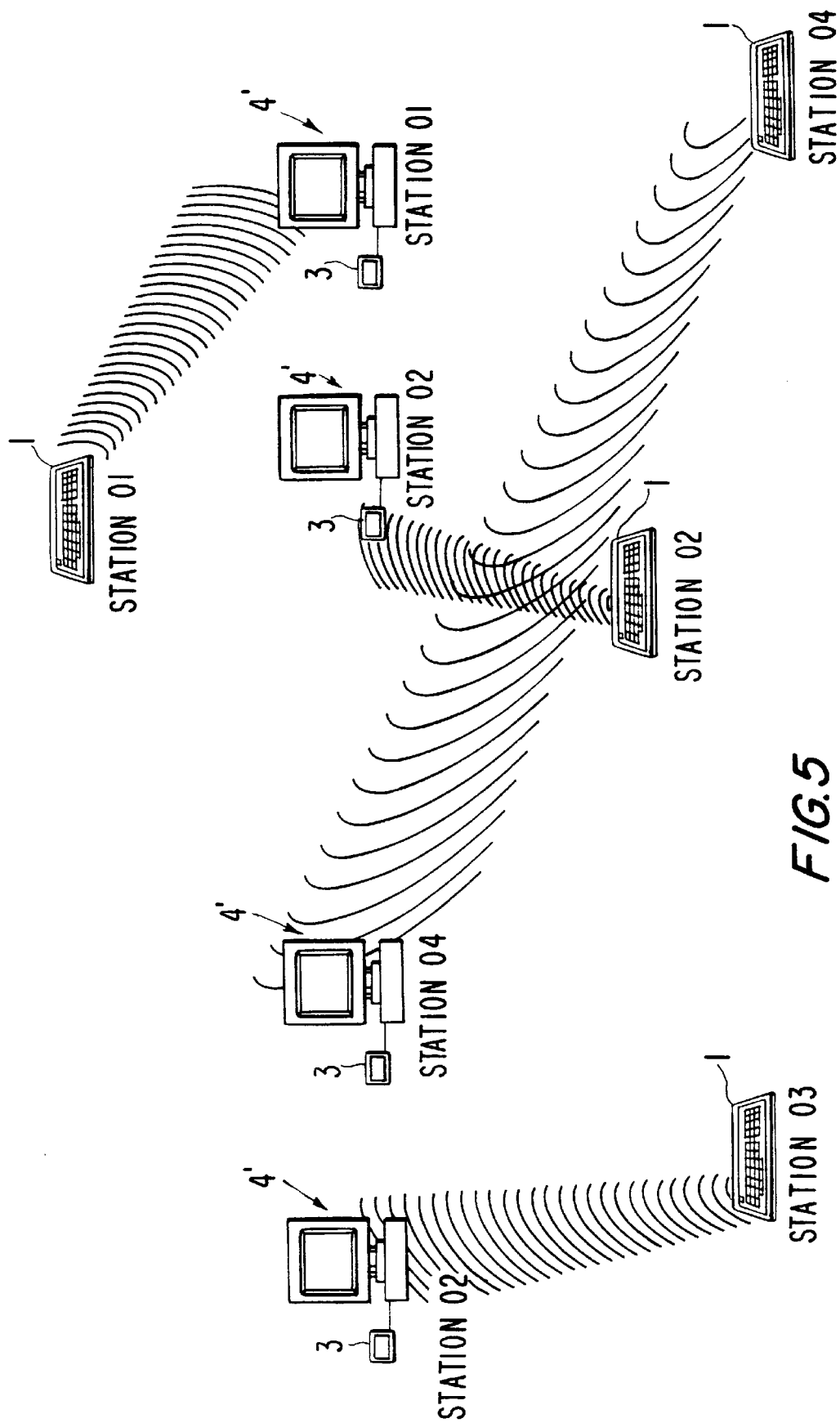
FIG. 5 is a diagrammatic representation of four membrane keyboards for separately controlling in each case one PC pursuant to the present invention.

For operation of the keyboard 6' in an office (cf. FIG. 5), use is preferably made of rechargeable batteries with connections that lead to the outside for recharging or charging. The connections are led to contacts which are arranged on the rear keyboard feet.

Like a normal keyboard, the receiver 3 set up in such a way is plug-connected to the PC 4 and is accepted by the PC 4 as a keyboard 1' since it has the same interface characteristics. Instead of this receiver 3, the normal keyboard can also be connected again to the PC 4 at any time.

I claim:

1. A keyboard system for activating a network-compatible personal computer to be operated, comprising:

a plurality of independent keyboards for generating activation signals, each of the keyboards having a keyboard address and including a key matrix that is scanable row-by-row and column-by-column;

wireless transmitter means for wirelessly transmitting the activation signals as light pulses which lie in an infrared range, the transmitter means being operative to send data messages in which a keyboard address is contained, the transmitter means having a transmission channel for each key of the keyboard, the transmitter means being operative to transmit data messages in which the keyboard address is in each case contained; and receiver means connectable to the personal computer to be operated for receiving the activation signals from the transmitter means, the receiver means including an address decoder and an address comparator that passes on data received from the transmitter means to the personal computer if the data match a preset dedicated address, the receiver means further including an address decoder that is operative to pass on data received in accordance with the decoded address to an interface card of the personal computer assigned to this address.

2. The keyboard system as defined in claim 1, wherein the transmitter means is operative to transmit the data messages in pulse form in the form of high-frequency oscillations of a specific frequency, the receiver means including a filter tuned to the specific frequency.

3. The keyboard system as defined in claim 2, wherein the transmitter means includes an element for setting a pulse duty factor.

4. The keyboard system as defined in claim 3, wherein the pulse duty factor is between 6% and 25%.

5. The keyboard system as defined in claim 1, wherein the transmitter means is operative to transmit a parity bit in the data message.

6. The keyboard system as defined in claim 1, wherein the transmitter means is operative to transmit a parity bit in the data message.

7. The keyboard system as defined in claim 1, wherein the transmission channels are arranged in a first group for controlling a personal computer and a second group for controlling other electrical equipment.

8. The keyboard system as defined in claim 1, wherein the transmitter means is operative to transmit with bi-phase amplitude modulation.

9. The keyboard system as defined in claim 1, and further comprising time counting circuit means initialized by actuation of each key on the keyboard, the time counting circuit means being operative to signal, after expiration of a characteristic time, an end of input from the key actuation and to switch on a power-saving standby mode.

10. The keyboard system as defined in claim 1, and further comprising power for powering the keyboard and the transmitter means.

11. The keyboard system as defined in claim 10, wherein the power supply means includes batteries integrated in the keyboard.

12. The keyboard system as defined in claim 10, wherein the power supply means includes batteries integrated in the keyboard and solar cells mounted on a surface of the keyboard, the solar cells and the batteries being operatively interconnected so that the batteries are operative when the solar cells no longer supply sufficient power.

13. The keyboard system as defined in claim 10, wherein the power supply means includes a rechargeable battery and charging connection means for recharging the battery.

14. The keyboard system as defined in claim 13, wherein the keyboard has rear feet, the charging connection means including contacts provided at the rear feet of the keyboard.

15. A keyboard system for activating a personal computer to be operated, comprising:

a keyboard for generating activation signals, the keyboard including a key matrix that is scanable row by row and column by column;

wireless transmitter means for wirelessly transmitting the activation signals as light pulses which lie in an infrared range, the transmitter means being operative to send data messages in which a keyboard address is contained, the transmitter means having a transmission channel for each key of the keyboard;

receiver means connectable to the personal computer to be operated for receiving the activation signals from the transmitter means, the receiver means including an address decoder and an address comparator that passes on data received from the transmitter means to the personal computer if the data match a preset dedicated address; and a plurality of interface cards mountable in the personal computer and associated with respective addresses, the receiver means being operative to direct the data to an appropriate one of the interface cards.

16. The keyboard system as defined in claim 15, wherein the transmitter means is operative to transmit the data messages in pulse form.

17. The keyboard system as defined in claim 16, wherein the transmitter means is operative to emit pulses in the form of high-frequency oscillations of a specific frequency, the receiver means including a filter tuned to the specific frequency.

18. The keyboard system as defined in claim 16, wherein the transmitter means includes an element for setting a pulse duty factor.

19. The keyboard system as defined in claim 18, wherein the pulse duty factor is between 6% and 25%.

20. The keyboard system as defined in claim 2, wherein the keyboard has keys that are arranged in a first group for controlling a personal computer and a second group for controlling other electrical equipment.

21. The keyboard system as defined in claim 2, wherein the keyboard is a membrane mouse.

22. The keyboard system as defined in claim 21, wherein the keyboard includes a bowl-shaped membrane support having a first, small outer surface and an opposite, second, larger outer surface, the membrane mouse including membrane contacts that adhesively attach to the small surface of the membrane support, the large surface of the membrane support having an adhesive thereon so that the membrane support is attachable to a flat member.

23. The keyboard system as defined in claim 2, wherein the keyboard is configured as a membrane numerical block.

24. The keyboard system as defined in claim 23, wherein the keyboard includes an oval, bowl-shaped membrane support which defines a small outwardly directed surface and an opposed, large outwardly directed surface, the membrane numerical block including membrane contacts which are adhesively attached to the small surface of the membrane support, the large surface of the membrane support being configured to adhere to a planar surface.

25. A keyboard system for activating a personal computer to be operated, comprising:

a keyboard for generating activation signals, the keyboard including a key matrix that is scanable row by row and column by column;

wireless transmitter means for wirelessly transmitting the activation signals as light pulses which lie in an infrared range, the transmitter means being operative to send data messages in which a keyboard address is contained, the transmitter means having a transmission channel for each key of the keyboard; and receiver means connectable to the personal computer to be operated for receiving the activation signals from the transmitter means, the receiver means including an address decoder and an address comparator that passes on data received from the transmitter means to the personal computer if the data match a preset dedicated address, the receiver means including an automatically operating sensitivity setting element (AGC), the transmitter means being operative to transmit a 2-bit carrier, at a beginning of a data message, for the AGC setting of the receiver means.

26. The keyboard system as defined in claim 25, wherein the transmitter means is operative to transmit the data message with a start bit after the 2-bit carrier for the AGC setting of the receiver means.

* * * * *